(12) United States Patent
Partenay et al.

(10) Patent No.: US 11,492,146 B2
(45) Date of Patent: Nov. 8, 2022

(54) METHOD AND DEVICE FOR THE CONNECTION AND LINEAR SEPARATION OF TWO ELEMENTS STUCK TOGETHER

(71) Applicant: ArianeGroup SAS, Paris (FR)

(72) Inventors: Carole Partenay, Louveciennes (FR); Felipe Medina, Sartrouville (FR)

(73) Assignee: ARIANEGROUP SAS, Paris (FR)

( * ) Notice: Subject to any disclaimer, the term of this patent is extended or adjusted under 35 U.S.C. 154(b) by 452 days.

(21) Appl. No.: 16/488,443

(22) PCT Filed: Feb. 26, 2018

(86) PCT No.: PCT/FR2018/050449
§ 371 (c)(1),
(2) Date: Aug. 23, 2019

(87) PCT Pub. No.: WO2018/158531
PCT Pub. Date: Sep. 7, 2018

(65) Prior Publication Data
US 2020/0010223 A1 Jan. 9, 2020

(30) Foreign Application Priority Data

Feb. 28, 2017 (FR) ..................... 17 51650

(51) Int. Cl.
*B64G 1/64* (2006.01)
*B64G 1/00* (2006.01)
*F42B 15/38* (2006.01)
*F42B 15/36* (2006.01)

(52) U.S. Cl.
CPC ............. *B64G 1/641* (2013.01); *B64G 1/002* (2013.01); *B64G 1/645* (2013.01); *F42B 15/36* (2013.01); *F42B 15/38* (2013.01)

(58) Field of Classification Search
CPC .......... F42B 15/36; F42B 15/38; B64G 1/641; B64G 1/645; B64G 1/64
See application file for complete search history.

(56) References Cited

U.S. PATENT DOCUMENTS

| 4,648,227 A | 3/1987 | Reusch |
| 2016/0169646 A1 | 6/2016 | Comtesse et al. |
| 2016/0169647 A1 | 6/2016 | Medina et al. |
| 2016/0195378 A1 | 7/2016 | Medina et al. |

(Continued)

FOREIGN PATENT DOCUMENTS

| FR | 2 806 342 A1 | 9/2001 |
| FR | 2 947 808 A1 | 1/2011 |
| WO | 2015/014941 A1 | 2/2015 |

OTHER PUBLICATIONS

International Search Report for International Application No. PCT/FR2018/050449 dated May 4, 2018.

(Continued)

*Primary Examiner* — Benjamin P Lee
(74) *Attorney, Agent, or Firm* — Pearne & Gordon LLP

(57) ABSTRACT

The invention relates to a device and a method for the connection and linear separation of two elements, such as the two stages of a spacecraft, consisting in using a tube containing a pyrogenic-type material and a glue arranged around the tube, particularly in contact with the elements. The pyrotechnic triggering of the pyrogenic material causes heating and the melting or carbonisation of the glue and the separation of the two elements.

7 Claims, 5 Drawing Sheets

(56) References Cited

U.S. PATENT DOCUMENTS

2017/0010077 A1 1/2017 Medina et al.
2018/0251220 A1 9/2018 Medina

OTHER PUBLICATIONS

Written Opinion for International Application No. PCT/FR2018/050449 dated May 4, 2018.
Preliminary French Search Report for French Application No. 17 51650 dated Nov. 28, 2017.

METHOD AND DEVICE FOR THE CONNECTION AND LINEAR SEPARATION OF TWO ELEMENTS STUCK TOGETHER

TECHNICAL FIELD

The invention relates to a linear separation, as smooth as possible, of a first element in relation to a second element, which are rigidly connected beforehand. Preferably, the invention applies to spatial launchers, for the separation of stages from one another or of a stage and the payload, of missiles, space probes, or even aircraft, in the case of a payload release. The purpose of said separation is to reduce the weight of the on-board assembly, or to release a payload. These applications are characterised by the fact that there is a need to separate objects that may be fragile, for example a satellite, and the connection of which has had to undergo high mechanical loads, as those undergone during the propulsion by a launcher.

PRIOR ART

FIGS. 1A and 1B illustrate said principle of separation between two elements 1 and 2 of a launcher. The first element 1 is, preferably, an element with rank n, preferably, a first engine stage. The second element is an element with rank n+1, either a second engine element, or a payload, for example a satellite. The linear separation, in the axis of the launcher, must therefore be carried out without deteriorating the base of the second element and, in the case where it is desired to recover the first element 1, without deteriorating the surface thereof, where the connection between said two elements 1 and 2 was located.

In the current state of the art, the connection-separation system is mainly of four types, which are the following:)

1°) the connections by bolting, riveting and pyrotechnic cutting off by local melting of the structure. These systems, due to the operation thereof, generate ejected material debris. In addition, the cutting off causes a significant impact in the structure, which may be damageable for the payloads of the launcher;

Patent document FR 2 947 808 shows an example of implementation of such a solution.)

2°) the connections by riveting and pyrotechnic cutting off by rupture of the structure, by means of the deformation of a pyrotechnic element. Said solution is the most employed and does not generate debris, but causes a very significant impact;)

3°) the connections by pyrotechnic bolting and rupture or separation of the nut. Said type of solution generates much fewer impacts than the two previous ones, but requires a plurality of bolts to transmit the forces from one element to the other, therefore generating higher failure risks due to the number of devices involved;)

4°) the connections by straps and ruptures thereof by pyrotechnic bolts. Said type of solution does not make it possible to transmit high forces between the two elements and does not allow for too large diameters for the launchers. Also, in this case, the release of stresses causes a significant impact in the structures.

Moreover, it is known a device and a method, as illustrated in FIGS. 2A, 2B and 2C, where a connecting element 13 includes, on an inner wall 14, a cutting ring 20. Said cutting ring is mainly composed of a body 21, ring-shaped and open on the side of the external diameter thereof. Same is filled with a pyrogenic material 22, that is to say heat generator, such as thermite. It is specified that the term thermite also encompasses nano-thermites.

With reference to FIG. 2B, the ignition of the material 22, consisting of a pyrotechnic substance, causes a sudden warming-up, up to the melting of the portions of the connecting element 13, being located opposite said material 22. The warming-up of said portion of the connecting element 13, up to the melting point thereof, causes the separation of said connecting element 13, into two portions. Said two portions are shown in FIG. 2C, an upper portion 13A and a lower portion 13B. The cutting ring 20 was attached beforehand by one of the edges 20A thereof to the wall 14 of the connecting element 13. Therefore, after the separation of the two lower 13B and upper 13A portions of the connecting element 13, the cutting ring 20 remains secured to one of the two portions, in this case the lower portion 13B of the connecting element 13. Indeed, in the application of an aeronautical launcher, it is chosen that the cutting ring 20 remains secured to the lower stage, which does not continue the flight of the aeronautical vehicle and falls back to earth. This makes it possible to prevent the structure continuing the flight from warming up for a duration longer than necessary.

In general, in the current state of said art, the systems deriving from said connection-separation solutions have the specific feature of leaving, most of the time, asperities on the external shape of the launcher, after the separation.

The aim of the invention is to remedy the above-mentioned drawbacks.

DESCRIPTION OF THE INVENTION

To this end, a first main aim of the invention is a device for the connection and linear separation of two elements, i.e. a first element and a second element, linearly connected to one another by connecting means, and having to be securely separated, the separation taking place by warming-up of the connecting means, said warming-up being triggered remotely, the device comprising:

the connecting means between the first and second elements;
a pyrogenic material, heat generator, placed close to the connecting means, that is to say arranged so as to enable a warming-up of said connecting means; and
means for remotely pyrotechnically triggering the pyrogenic material.

According to the invention, in the device:
the pyrogenic material is placed in a tube, same placed between the first element and the second element;
the connecting means are composed of the adhesive and are placed between the tube and the first and second elements.

In the main embodiment of the device, the adhesive is a thermally insulating adhesive in relation to the tube and the first and second elements.

In a specific embodiment of the device, a retainer system for retaining the tube is provided on the first element.

Preferably, the retainer system is metallic.

In a main application of the device, the first element is a carrier stage of the second element carried by a space vehicle.

In a preferred embodiment of the invention, the pyrogenic material is a mixture of thermite and an intermetallic composition.

Another main aim of the invention is a method for the connection and linear separation of two elements, a first element and a second element intended to be linearly connected to one another temporarily by connecting means, and having to be securely separated, the separation taking place by generally rapid and partial warming-up of the connecting means, the warming-up being triggered remotely.

According to the invention, the method comprises the following stages:

connecting the first element and the second element by the adhesive;

disposing the pyrogenic material, that is to say heat generator, in a tube, same placed between the first element and the second element, in the middle of the adhesive, the pyrogenic type material being activatable by an electrical control connection;

pyrotechnically triggering said pyrogenic type material in order to cause the rapid warming-up of the adhesive and to obtain the separation of the first and second elements.

BRIEF DESCRIPTION OF THE DRAWINGS

The invention and the technical features thereof will be better understood upon reading the following description given by way of non-limiting example, accompanied by a plurality of figures respectively showing.

DETAILED DESCRIPTION OF PREFERRED EMBODIMENTS

Figure 1A:
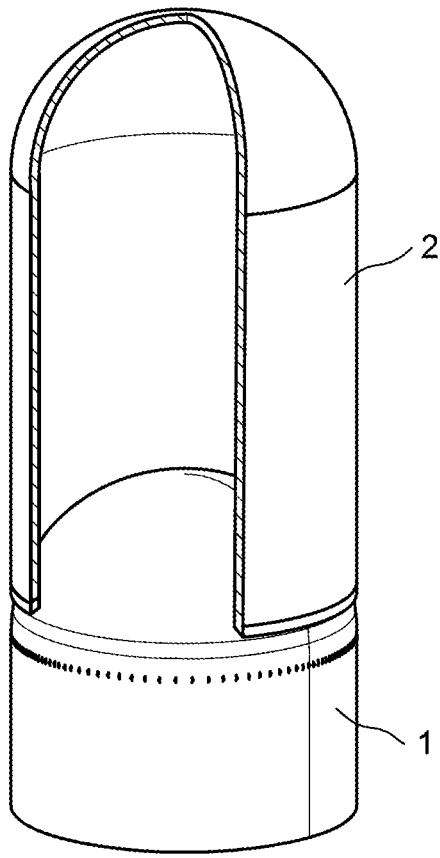
FIGS. 1A and 1B: diagrams showing the separation of two elements of an aeronautical launcher.
Figure 1B:
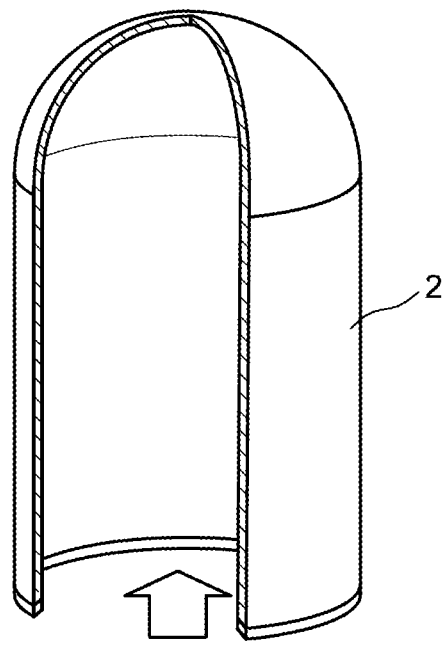
Figure 1B:
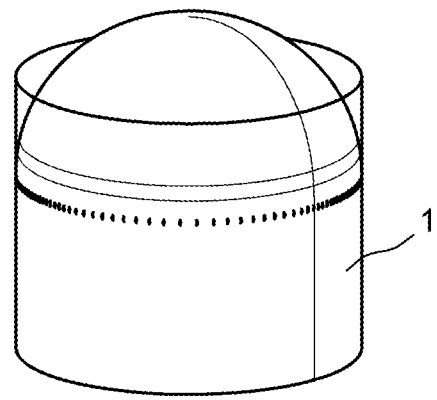
Figure 2A:
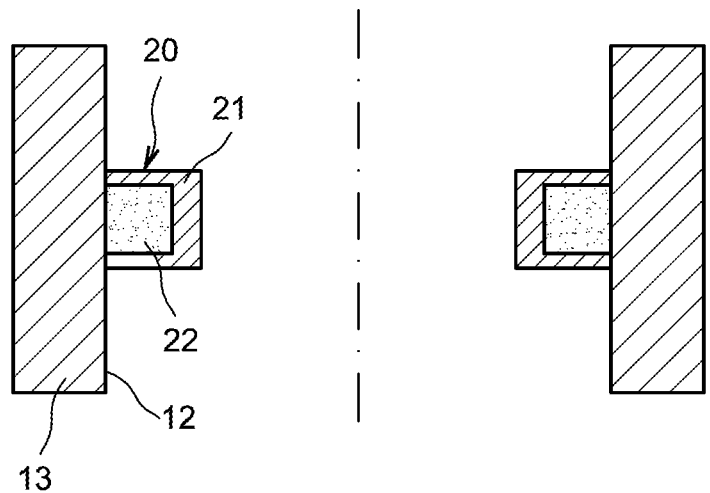
FIGS. 2A, 2B and 2C: the operating principle of a device of prior art.
Figure 2B:
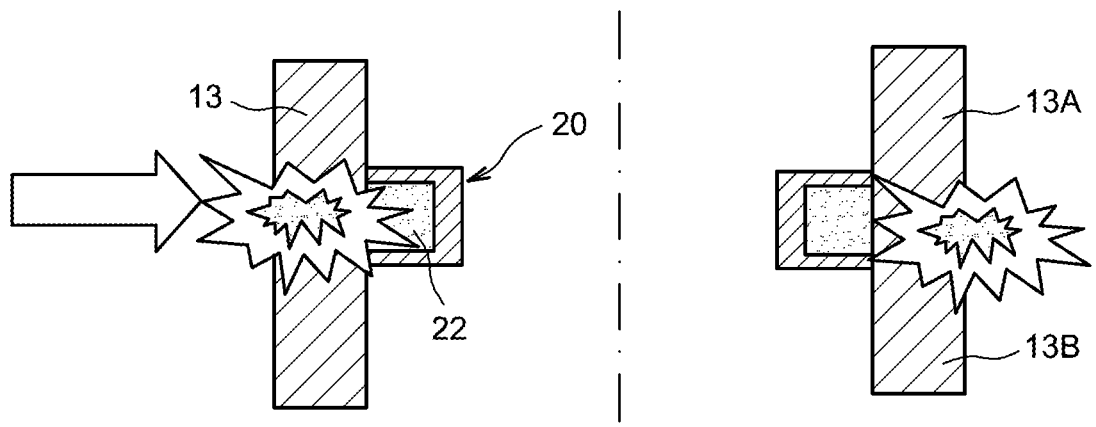
Figure 2C:
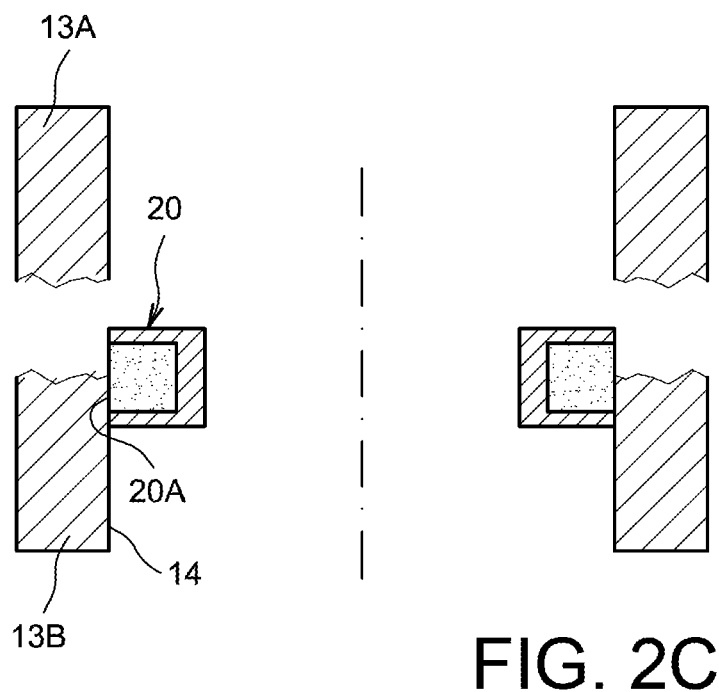
Figure 3:
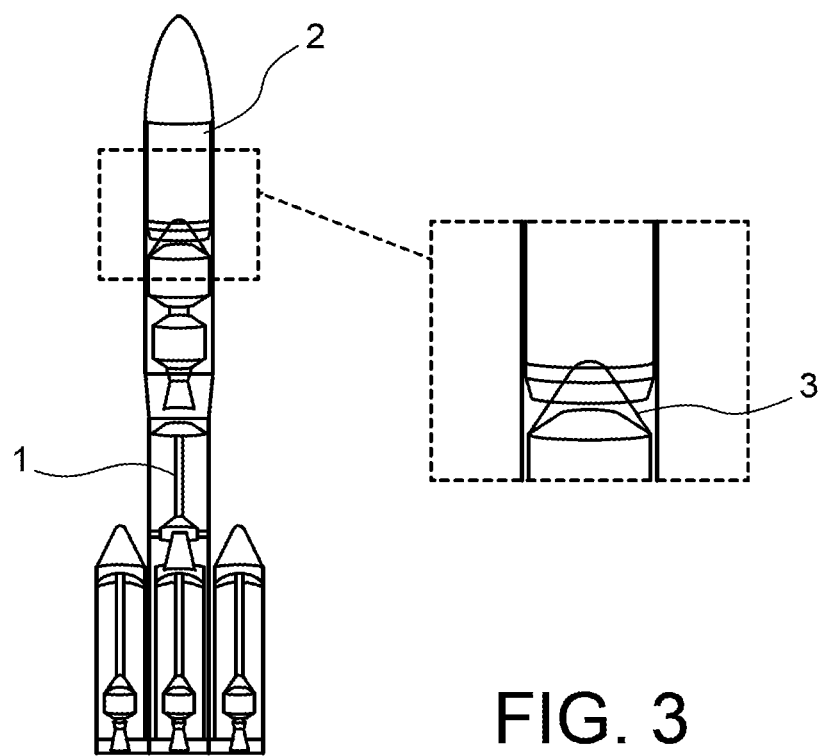
FIG. 3: a diagram showing the location of the device according to the invention, applied to an aeronautical launcher.

FIG. 3 shows an aeronautical launcher having a first carrier stage 1 with the propellers thereof and carrying, above the upper portion thereof, a portion to be put into orbit, or an upper stage. In the box showing an enlargement is located a connection between said two elements of the aeronautical launcher.

Figure 4A:
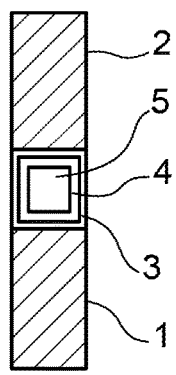
FIGS. 4A, 4B and 4C: three diagrams showing the device according to the invention and the operation thereof.
Figure 4A:
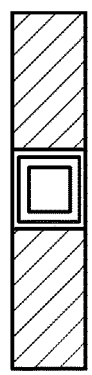

FIG. 4A shows schematically, in cross-section, the first and second elements 1 and 2 separated by a portion shown as a square shape symbolising the connecting means. Said connecting means contain a tube containing a pyrogenic type material 5. Preferably, said pyrogenic type material is a mixture of thermite and of one or more metallic materials, that is to say an intermetallic composition.

The thermite may also be nano-thermite.

The tube 4 is surrounded by an adhesive 3, notably in the upper and lower portions that are located in contact with the first and second elements 1 and 2. The adhesive 3 therefore provides the junction and the holding between said first and second elements 1 and 2, and this in a sealed manner.

The adhesive 3 is for example an adhesive obtained by the INDAR process developed by RESCOLL, or even an EA 9395 type adhesive.

Figure 4B:
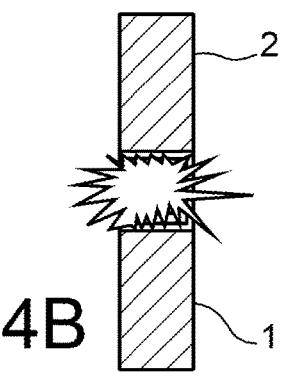
Figure 4B:
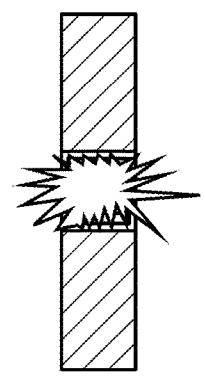

With reference to FIG. 4B, at a given moment, the pyrogenic type material is ignited, pyrotechnically, with the triggering means placed remotely in relation to the connection between the first element 1 and the second element 2 and acting on the pyrogenic material 5 by means of an electrical connection. A very rapid warming-up of one portion of at least the pyrogenic type material takes place, therefore rapidly reaching a sufficient temperature for making the adhesive melt. Of course, the tube 4 must have a melting point for guaranteeing the integrity thereof during said triggering, and the rise in temperature, whilst making it possible to warm up the adhesive up to the carbonisation thereof and therefore the elimination of the connection effect thereof with the first and second elements 1 and 2. Said first and second elements are thus separated.

Figure 4C:
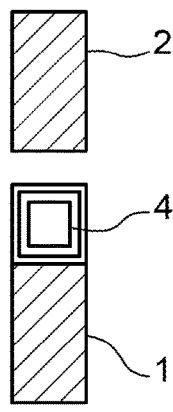
Figure 4C:

FIG. 4C shows said separation with the first element 1 carrying what remains of the connecting means, that is to say in particular the tube 4. The second element 2 is therefore separated from the first element 1. Therefore, it is understood that the separation of two stages of an aeronautical vehicle can be performed, notably between a first carrier stage, composed of the first element 1 and a second stage having to continue its ascent towards space and being composed of a second element 2.

In said architecture, the general forces transmit through the bonded connection and the metallic tube 4, which are therefore dimensioned accordingly. It is noted that on FIGS. 4A, 4B and 4C, the first element 1 and second element 2 may form an intermediate ring between the two stages of an aeronautical vehicle, that is to say composed of an intermediate connection between said two stages.

In the preferred embodiment of the invention, a retainer system is provided on the first element 1 of the connecting means, notably of the tube 4, after pyrotechnical triggering.

Figure 5A:
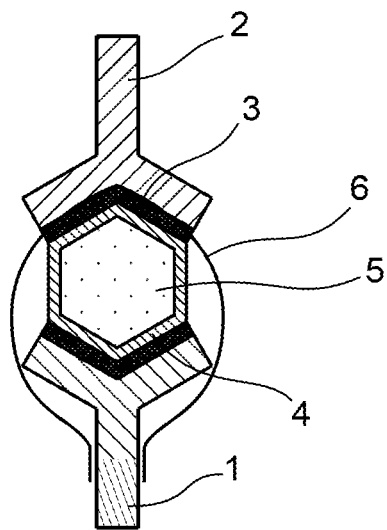
FIGS. 5A, 5B and 5C: three diagrams relating to a preferential implementation of the device according to the invention and the operation thereof.
Figure 5B:
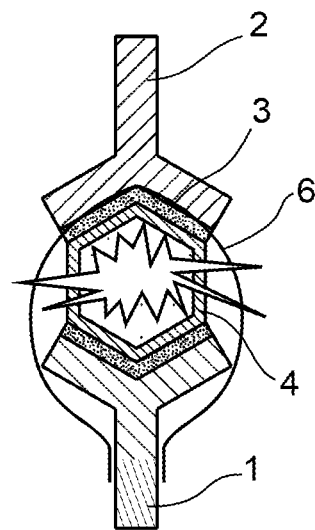
Figure 5C:
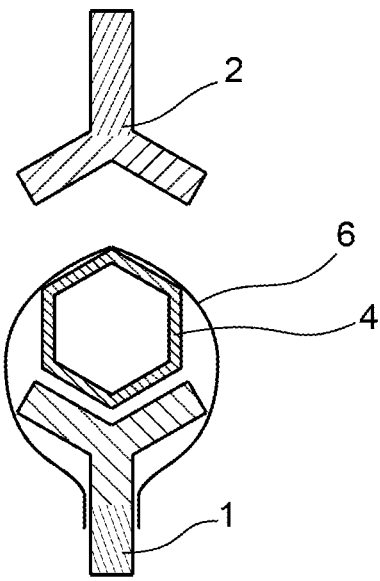

With reference to the half-views in axial section in FIGS. 5A, 5B and 5C, a specific embodiment of the invention is the following.

The first element 1 and second element 2 have an enlarged end. On one end surface of said first and second elements is placed the adhesive 3 which surrounds entirely, or at least partially, the tube 4 filled with pyrogenic type material 5.

As illustrated in FIG. 5B, the ignition of the pyrogenic type material 5 causes the warming-up and the melting or the carbonisation of the adhesive 3.

The retainer system 6 is attached to the first element 1 and surrounds at least the tube 4.

Preferably, the retainer system 6 includes apertures for the passage of the adhesive 3.

As shown in FIG. 5C, after the pyrotechnical triggering, there is separation of the first and second elements 1 and 2. The retainer system 6 still surrounds the tube 4, which is retained with the first element 1. It is provided that said retainer system is composed of a metallic film surrounding the tube 4, about the entire circumference thereof, same being annular as the elements 1 and 2. Said retainer system 6 must have a high melting point, in order to withstand the heat released by the pyrogenic type material. The melting point of the retainer system 6 and same of the tube 4 are in particular higher than the melting point of the adhesive 3.

Concerning said adhesive, the choice of the thermite may be made depending on the adhesive used, as well as the features of the material used to constitute the tube.

Alternatively, the retainer system 6 may be attached directly to the lateral regions of the tube 4 each arranged between the portions of the tube that are in contact with the adhesive 3.

In other words, the invention relates to an assembly including a first element 1 and a second element 2 linearly connected to one another by connecting means, and comprising, further to the connecting means, a pyrogenic material and means for remotely pyrotechnically triggering the pyrogenic material, wherein:

the pyrogenic material 5 is placed in a tube 4, same placed between the first element 1 and the second element 2, and the connecting means are composed of an adhesive 3 placed between the tube 4 and each of the first and second elements 1, 2.

A method for temporary connection of a first element and of a second element according to the invention therefore includes the steps consisting of:

placing a pyrogenic material in a tube provided with means for remotely pyrotechnically triggering the pyrogenic material; then interposing an adhesive between the tube and the first element, and between the tube and the second element so that the adhesive provides the attachment of each of the first and second elements to the tube.

A method for separation of a first element and of a second element connected beforehand by means of the above temporary connection method, and therefore forming an assembly of the type described above, consists of operating a pyrotechnical triggering of the pyrogenic material 5 so that a warming-up of the pyrogenic material 5 causes a warming-up of the adhesive 3 for the melting or the carbonisation of said adhesive 3 and therefore the mutual separation of the first and second elements 1, 2.

The device and the method according to the invention may be used in the civilian sector as well as in the military sector. It is noted that the invention makes a reduced, or even nonexistent, level of pyrotechnical impacts possible, which is vital for the durability of the equipment, notably the second element.

By preventing the use of metallic connecting means between the first and second elements, it overcomes the generation of metallic debris, melted or not, after the pyrotechnical triggering.

The invention claimed is:

1. Device for the connection and linear separation of two elements including a first element and a second element linearly connected to one another by connecting means, and having to be securely separated, the separation taking place by warming-up of the connecting means, said warming-up being triggered remotely, the device comprising:

the connecting means between the first and second elements;

a pyrogenic material, heat generator, placed close to the connecting means; and means for remotely pyrotechnically triggering the pyrogenic material, wherein:

the pyrogenic material is placed in a tube, the tube being placed between the first element and the second element; and the connecting means are composed of an adhesive placed between the tube and each of the first and second elements, wherein a melting point of the tube is higher than a melting point of the adhesive.

2. Device according to claim 1, wherein the adhesive is a thermally insulating adhesive in relation to the tube and the first and second elements.

3. Device according to claim 1, further comprising a retainer system for retaining the tube on the first element, wherein a melting point of the retainer system is higher than a melting point of the adhesive.

4. Device according to claim 3, wherein the retainer system is metallic.

5. Device according to claim 1, wherein the device is applied to a space vehicle, the first element corresponding to a carrier stage, the second element corresponding to a carried stage.

6. Device according to claim 1, wherein the pyrogenic material is a mixture of thermite and an intermetallic composition.

7. Method for the connection and linear separation of two elements, a first element and a second element intended to be linearly connected to one another temporarily by connecting means, and having to be securely separated, the separation taking place by warming-up of the connecting means, said warming-up being triggered remotely, wherein the method comprises the following steps:

connecting the first element and the second element by adhesive;

disposing a pyrogenic material, heat generator, in a tube having a melting point higher than a melting point of the adhesive, the tube being placed between the first element and the second element, in the middle of the adhesive, the pyrogenic material being activatable by an electrical control connection; and pyrotechnically triggering said pyrogenic material in order to cause the rapid warming-up of the adhesive and to obtain the separation of the first and second elements.

* * * * *